(12) United States Patent
Kuo et al.

(10) Patent No.: US 11,749,817 B2
(45) Date of Patent: Sep. 5, 2023

(54) NOZZLE FOR COMBUSTION AND REFORMING REACTION, COMBUSTOR, AND FUEL CELL SYSTEM

(71) Applicant: INDUSTRIAL TECHNOLOGY RESEARCH INSTITUTE, Hsinchu (TW)

(72) Inventors: Pei-Chi Kuo, Tainan (TW); Cheng-Hao Yang, Tainan (TW); Shing-Cheng Chang, Kaohsiung (TW); Yen-Hsin Chan, Taoyuan (TW); Wen-Sheng Chang, Hsinchu (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 278 days.

(21) Appl. No.: 17/085,867

(22) Filed: Oct. 30, 2020

(65) Prior Publication Data

US 2022/0131163 A1 Apr. 28, 2022

(30) Foreign Application Priority Data

Oct. 23, 2020 (TW) .................... 109136933

(51) Int. Cl.
*H01M 8/04089* (2016.01)
*H01M 8/0612* (2016.01)
(Continued)

(52) U.S. Cl.
CPC ... *H01M 8/04097* (2013.01); *H01M 8/04007* (2013.01); *H01M 8/04738* (2013.01); *H01M 8/0618* (2013.01); *H01M 8/2457* (2016.02)

(58) Field of Classification Search
CPC ......... H01M 8/04007; H01M 8/04097; H01M 8/04738; H01M 8/0618; H01M 8/2457
See application file for complete search history.

(56) References Cited

U.S. PATENT DOCUMENTS 9,698,441 B2  7/2017  Ogawa
10,651,487 B2  5/2020  Yang
(Continued)

FOREIGN PATENT DOCUMENTS

CN   1914118 A   2/2007
CN   101471449 A   7/2009
(Continued)

OTHER PUBLICATIONS

Taiwan Office Action dated Nov. 24, 2021 as received in application No. 109136933.
(Continued)

*Primary Examiner* — Brian R Ohara
*Assistant Examiner* — Brent C Thomas
(74) *Attorney, Agent, or Firm* — Maschoff Brennan

(57) ABSTRACT

The disclosure provides a nozzle for combustion and reforming reaction including a fuel pipe, a reformer, an activation pipe, an activation catalyst, and a reformation catalyst. The fuel pipe includes an annular wall and an end wall connected to an end of the annular wall. The fuel pipe has at least one vent hole penetrating through the annular wall and at least one outlet penetrating through the end wall. The reformer is disposed in the fuel pipe. The activation pipe is disposed in the fuel pipe and disposed through the reformer. A distance between the activation pipe and the outlet is larger than a distance between the vent hole and the outlet. The activation catalyst is arranged in the activation pipe. The reformation catalyst is arranged in the reformer and located outside the activation pipe. The disclosure also provides a combustor and a fuel cell system having the nozzle.

16 Claims, 3 Drawing Sheets

(51) Int. Cl.
  *H01M 8/2457* (2016.01)
  *H01M 8/04007* (2016.01)
  *H01M 8/04701* (2016.01)

(56) References Cited

U.S. PATENT DOCUMENTS

| | | | |
|---|---|---|---|
| 2007/0072950 A1* | 3/2007 | Lee | B01J 8/0214 |
| | | | 422/202 |
| 2010/0261073 A1* | 10/2010 | Wang | H01M 8/04089 |
| | | | 429/413 |
| 2018/0191007 A1 | 7/2018 | Perry | |
| 2019/0157692 A1* | 5/2019 | Yang | H01M 8/22 |
| 2022/0021010 A1* | 1/2022 | Bang | H01M 8/04738 |

FOREIGN PATENT DOCUMENTS

| | | |
|---|---|---|
| CN | 102214829 A | 10/2011 |
| JP | H3-218902 A | 9/1991 |
| TW | 181406 | 5/1980 |
| TW | I502801 B | 10/2015 |
| TW | I626784 B | 6/2018 |
| TW | I658639 B | 5/2019 |
| TW | I673224 B | 10/2019 |
| TW | I697150 B | 6/2020 |
| WO | 2010/066462 A1 | 6/2010 |

OTHER PUBLICATIONS

Sanchez et al., "Experimental evaluation of a 20 kW oxygen enhanced self-regenerative burner operated in flameless combustion mode" Nov. 2013.

Luo et al., "Experimental study on flow and combustion characteristic of a novel swirling burner based on dual register structure for pulverized coal combustion" Apr. 2014.

Pashchenko "Hydrogen-rich fuel combustion in a swirling flame: CFD-modeling with experimental verification" Jun. 13, 2020.

Nguyen et al., "Optimal design of a sleeve-type steam methane reforming reactor for hydrogen production from natural gas" Dec. 2018.

* cited by examiner

NOZZLE FOR COMBUSTION AND REFORMING REACTION, COMBUSTOR, AND FUEL CELL SYSTEM

CROSS-REFERENCE TO RELATED APPLICATIONS

This non-provisional application claims priority under 35 U.S.C. § 119(a) on patent application No(s). 109136933 filed in Taiwan, R.O.C. on Oct. 23, 2020, the entire contents of which are hereby incorporated by reference.

TECHNICAL FIELD

The disclosure relates to a nozzle, more particularly to a nozzle for combustion and reforming reaction. In addition, the disclosure also relates to a combustor and a fuel cell system having the nozzle.

BACKGROUND

A typical fuel cell system is an electrochemical cell that can convert the chemical energy of a fuel (often hydrogen) at the anode of the cell stack and an oxidizing agent (often oxygen) at the cathode of the cell stack into electricity. At the anode, the fuel undergoes oxidation reactions that generate ions (often positively charged hydrogen ions) and electrons. At the same time, electrons flow from the anode to the cathode through a circuit to produce direct current electricity. At the cathode, the ions, electrons, and oxygen are caused to react, forming water and possibly other products. In addition, most of the fuel cells use carbon-based resources for fuel, thus a reformer for converting the carbon-based resources into hydrogen (i.e., the fuel) and carbon dioxide is needed.

However, the temperature of the reformer is relatively low when the system begins to operate, resulting in low efficiency of the fuel reforming process. At this stage, the gas provided to the cell stack from the reformer may cause carbon to accumulate on the electrode.

SUMMARY

Accordingly, the disclosure provides a nozzle, a combustor, and a fuel cell system, which is capable of increasing the efficiency of the fuel reforming process for preventing the accumulation of carbon on the cell stack of the fuel cell system.

One embodiment of the disclosure provides a nozzle for combustion and reforming reaction. The nozzle includes a fuel pipe, a reformer, an activation pipe, an activation catalyst, and a reformation catalyst. The fuel pipe includes an annular wall and an end wall connected to an end of the annular wall. The fuel pipe has at least one vent hole penetrating through the annular wall and at least one outlet penetrating through the end wall. The reformer is disposed in the fuel pipe. The activation pipe is disposed in the fuel pipe and disposed through the reformer. A distance between the activation pipe and the outlet is larger than a distance between the vent hole and the outlet. The activation catalyst is arranged in the activation pipe. The reformation catalyst is arranged in the reformer and located outside the activation pipe.

Another embodiment of the disclosure provides a combustor. The combustor includes the aforementioned nozzle and the casing. The nozzle is disposed in the casing.

Still another embodiment of the disclosure provides a fuel cell system. The fuel cell system includes the aforementioned combustor, a main reformer, and a fuel cell stack. The main reformer is connected to the reformer of the nozzle of the combustor. The fuel cell stack has an anode gas inlet and an anode gas outlet. The anode gas inlet is connected to the main reformer, and the anode gas outlet is connected to the fuel pipe of the nozzle of the combustor.

According to the nozzle, the combustor, and the fuel cell system as discussed above, the reformer is disposed in the fuel pipe of the nozzle, and the activation pipe is disposed through the reformer. Such that the temperature of the reformation catalyst in the reformer can be increased by the reaction between the activation catalyst and the activation fuel when the fuel cell system begins to operate. Thereby increasing the efficiency of the reforming process of the reformer and decreasing the ratio of the reformation fuel, that is not yet reformed by the reformer, to the gas flowing out of the reformer. Therefore, when the gas output from the reformer is provided to the fuel cell stack, the accumulation of carbon on the fuel cell stack can be prevented.

BRIEF DESCRIPTION OF THE DRAWINGS

The present disclosure will become better understood from the detailed description given herein below and the accompanying drawings which are given by way of illustration only and thus are not intending to limit the present disclosure and wherein.

DETAILED DESCRIPTION

Figure 1:
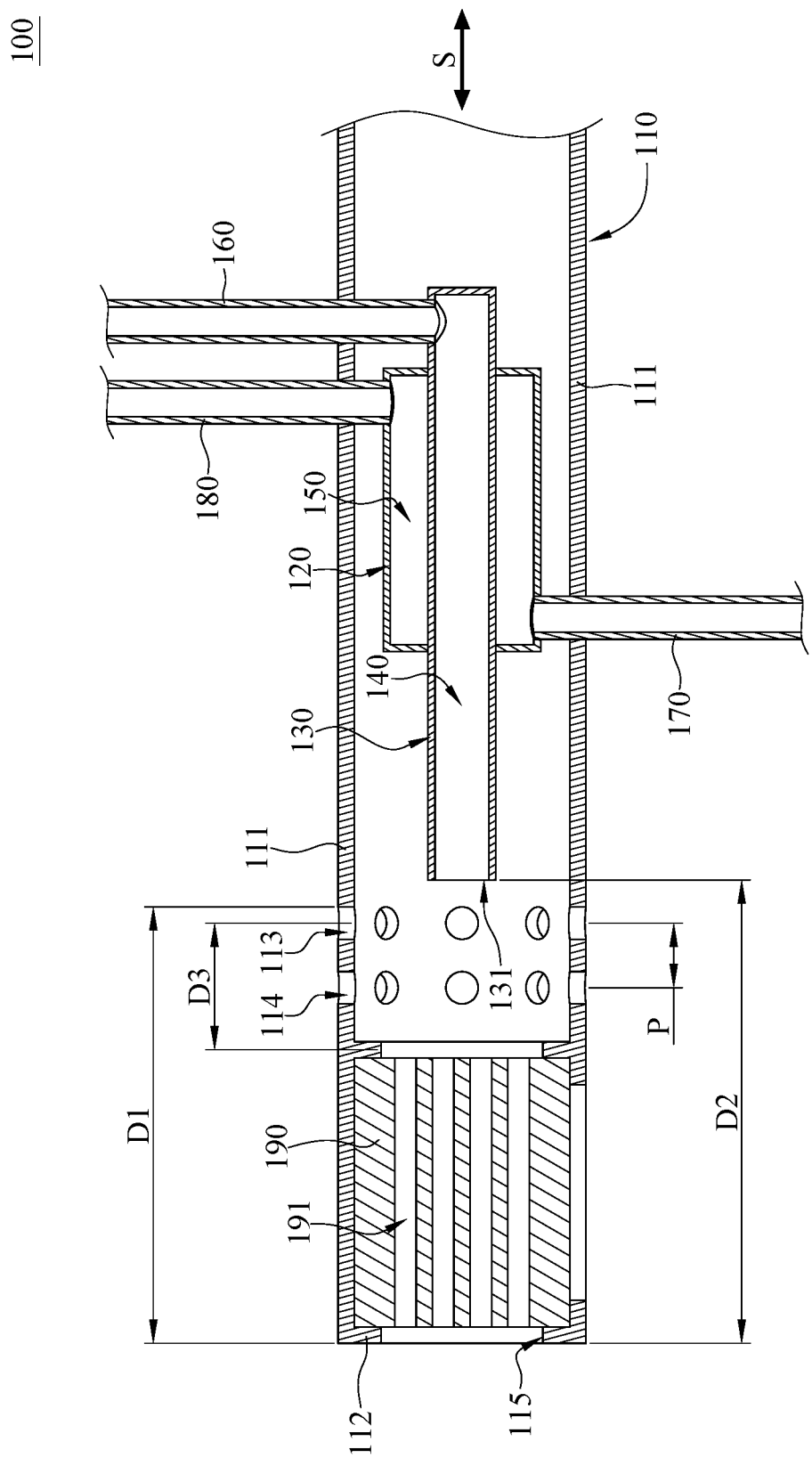
FIG. 1 is a cross-sectional view of a nozzle according one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained, unless the terms have a specific meaning in the present disclosure.

The following description illustrates detail features and advantages of embodiments of the disclosure. Those skilled in this art can implement embodiments of the disclosure according to the content of the following description. According to the detail description, claims, and figures, those skilled in this art can easily understand the purpose and merits of the disclosure. The following embodiment will further discuss the aspects of the disclosure, but the disclosure is not limited thereto.

In the figures of the disclosure, for the purpose of the illustration, the size, proportion, and angle may be exaggerated, but the disclosure is not limited thereto. The embodiments of the disclosure can be modified without deviating the scope of the disclosure. The terms, such as "above", "below", "front", "rear" and so on, used in the embodiments and figures is for the explanation, but the disclosure is not limited thereto.

Referring to FIG. 1, there is shown a cross-sectional view of a nozzle 100 according one embodiment of the disclosure.

In this embodiment, the usage of the nozzle 100 involves combustion reactions and fuel reforming process. As shown, the nozzle 100 includes a fuel pipe 110, a reformer 120, an activation pipe 130, an activation catalyst 140, a reformation catalyst 150, an activation guidance pipe 160, a first reformation guidance pipe 170, a second reformation guidance pipe 180, and a ceramic heat storage component 190.

The fuel pipe 110 includes an annular wall 111 and an end wall 112 connected to an end of the annular wall 111. The fuel pipe 110 has a plurality of vent holes 113 and 114 penetrating through the annular wall 111 and an outlet 115 penetrating through the end wall 112. In this embodiment, the quantity of the vent holes 113 and 114 is sixteen, wherein there are eight vent holes 113 and eight vent holes 114. In more detail, the vent holes 113 are spaced apart from one another and arranged in a circle along the circumference of the annular wall 111. The vent holes 114 are also spaced apart from one another and arranged in another circle along the circumference of the annular wall 111, where the circles of the vent holes 113 and 114 are spaced apart by a distance P along the axial direction of the annular wall 111. Note that the quantity and the arrangement of the vent holes 113 and 114 can be modified as required and are not intended to limit the disclosure. In addition, the quantity of the outlet 115 can be modified as required as well; in some other embodiments, the fuel pipe 110 may have more than one outlet 115.

The reformer 120 is disposed in the fuel pipe 110. The activation pipe 130 is disposed in the fuel pipe 110 and is disposed through the reformer 120. The activation pipe 130 has an open end 131 facing towards the end wall 112 of the fuel pipe 110. The vent holes 113 are located closer to the open end 131 of the activation pipe 130 than the vent holes 114. The maximum distance between the vent hole 113 and the outlet 115 along the axial direction is referred to as D1. The distance between the open end 131 of the activation pipe 130 and the outlet 115 along the axial direction is referred to as D2. As shown, D2 is larger than D1.

The activation catalyst 140 is arranged in the activation pipe 130. Specifically, the activation catalyst 140 can be filled in the activation pipe 130 and/or disposed at the inner surface of the activation pipe 130. The reformation catalyst 150 is arranged in the reformer 120 and located outside the activation pipe 130. The reformation catalyst 150 can be filled in the space between the inner surface of the reformer 120 and the outer surface of the activation pipe 130, and/or disposed at the inner surface of the reformer 120 and the outer surface of the portion of the activation pipe 130 located in the reformer 120.

The activation guidance pipe 160 is disposed through the annular wall 111 of the fuel pipe 110 and is in fluid communication with the activation pipe 130. The reformer 120 is located between the activation guidance pipe 160 and the vent holes 113 in an extension direction S of the activation pipe 130. Also, the reformer 120 is located between the activation guidance pipe 160 and the open end 131 of the activation pipe 130.

The first reformation guidance pipe 170 and the second reformation guidance pipe 180 are disposed through the annular wall 111 of the fuel pipe 110 and are in fluid communication with the reformer 120. In the extension direction S of the activation pipe 130, the first reformation guidance pipe 170 is located between the second reformation guidance pipe 180 and the vent holes 113. Also, in the extension direction S of the activation pipe 130, the first reformation guidance pipe 170 is located between the second reformation guidance pipe 180 and the open end 131 of the activation pipe 130. The first reformation guidance pipe 170 is configured for the inlet of gas into the reformer 120, and the second reformation guidance pipe 180 is configured for the outlet of gas from the reformer 120.

The ceramic heat storage component 190 is disposed at the end wall 112 of the fuel pipe 110 and the outlet 115. The ceramic heat storage component 190 has a porosity smaller than 100%. In detail, in this embodiment, the ceramic heat storage component 190 has a plurality of channels 191, and the porosity of the ceramic heat storage component 190 is determined by the weighted calculation of the volumes of the channels 191, but the present disclosure is not limited thereto. In some other embodiment, the ceramic heat storage component may not have any channel 191, and the porosity of the ceramic heat storage component is measured by the void spaces in material.

The total area of the vent holes 113 and 114 is referred to as A, the area of outlet 115 is referred to as B, and the porosity of the ceramic heat storage component 190 is referred to as C, where (A/B)/C ranges between 0.07 and 3.21, but the present disclosure is not limited thereto. In some other embodiments that the nozzle does not have the ceramic heat storage component 190, A/B may range between 0.07 and 3.21.

The ratio of the mass flow rate from the vent holes 113 and 114 to that from the fuel pipe 110 is referred to as q (%) (also called mass flow rate ratio). In one example, the fuel pipe 110 has an inner diameter of 40 mm, the distance P between the vent holes 113 and 114 is 12 mm, a distance D3 between the circle arranged by the vent holes 113 and the ceramic heat storage component 190 is 22 mm, the porosity C of the ceramic heat storage component 190 is 60%, the flow rate of the fuel pipe 110 is 100 LPM, the temperature in the fuel pipe 110 is 700 degrees Celsius, the vent holes 113 and 114 each have an inner diameter ranging between 1 mm and 7 mm, A/B ranges between 0.07 and 3.21, and q can be presented in the form of equation as: q (%)=$-1.0255x^4+11.27x^3-48.7x^2+103.47x-2.1225$, where x=(A/)B/60%.

When the nozzle 100 is in use, an activation fuel is introduced into the activation pipe 130 through the activation guidance pipe 160, where the activation fuel may be a hydrocarbon fuel. The activation catalyst 140 in the activation pipe 130 can facilitate the reaction of producing hydrogen, carbon monoxide, and other possible products, and heat is produced during this process. And the heat can raise the temperature of the reformation catalyst 150 which is located in the reformer 120 and outside the activation pipe 130. At this moment, a reformation fuel is introduced into the reformer 120 through the first reformation guidance pipe 170, where the reformation fuel may be a hydrocarbon fuel, such as methane. The reformation catalyst 150 then can cause the reformation fuel to produce hydrogen, carbon monoxide, carbon dioxide, and other possible products. With the increase of the temperature of the reformation catalyst 150, the gas produced by the reformation fuel can be more efficient, increasing the proportion of the hydrogen. Then, the produced gas and the remaining reformation fuel can flow out of the reformer 120 through the second reformation guidance pipe 180. When q is between 1% and 98% and the temperature in fuel pipe 110 is between 25 and 1200 degrees Celsius, the ratio of the hydrogen to the gas flowing into the second reformation guidance pipe 180 is equal to or larger than 75%.

In addition, the hydrogen and carbon monoxide coming out of the open end 131 of the activation pipe 130 has a relatively high temperature and can flow out of the fuel pipe 110 via the vent holes 113 and 114 and the outlet 115. Then, the hydrogen and carbon monoxide can contact with the ambient air (e.g., oxygen) outside the fuel pipe 110 to cause a dramatic combustion reaction therebetween, thus producing carbon dioxide and water steam of even higher temperature, and the temperature of the other ambient air (e.g., oxygen) that does not yet involve in the combustion reaction will be raised thereby. As discussed, the vent holes 113 and 114 are located closer to the first reformation guidance pipe 170 and the second reformation guidance pipe 180 than the outlet 115. Thus the carbon dioxide, the water steam, and the ambient air (e.g., oxygen) around the vent holes 113 and 114 can rapidly increase the temperature of the first reformation guidance pipe 170 and the second reformation guidance pipe 180. Therefore, the temperature of the reformation fuel entering into the reformer 120 from the first reformation guidance pipe 170 is raised, improving the efficiency of the reforming process and increasing the proportion of hydrogen therein. As a result, the temperature of the gas in the second reformation guidance pipe 180 is raised, such that the gas feed to the fuel cell stack of a fuel cell system is in high temperature and with abundant hydrogen, preventing the accumulation of carbon on electrodes of the fuel cell stack.

Figure 2:
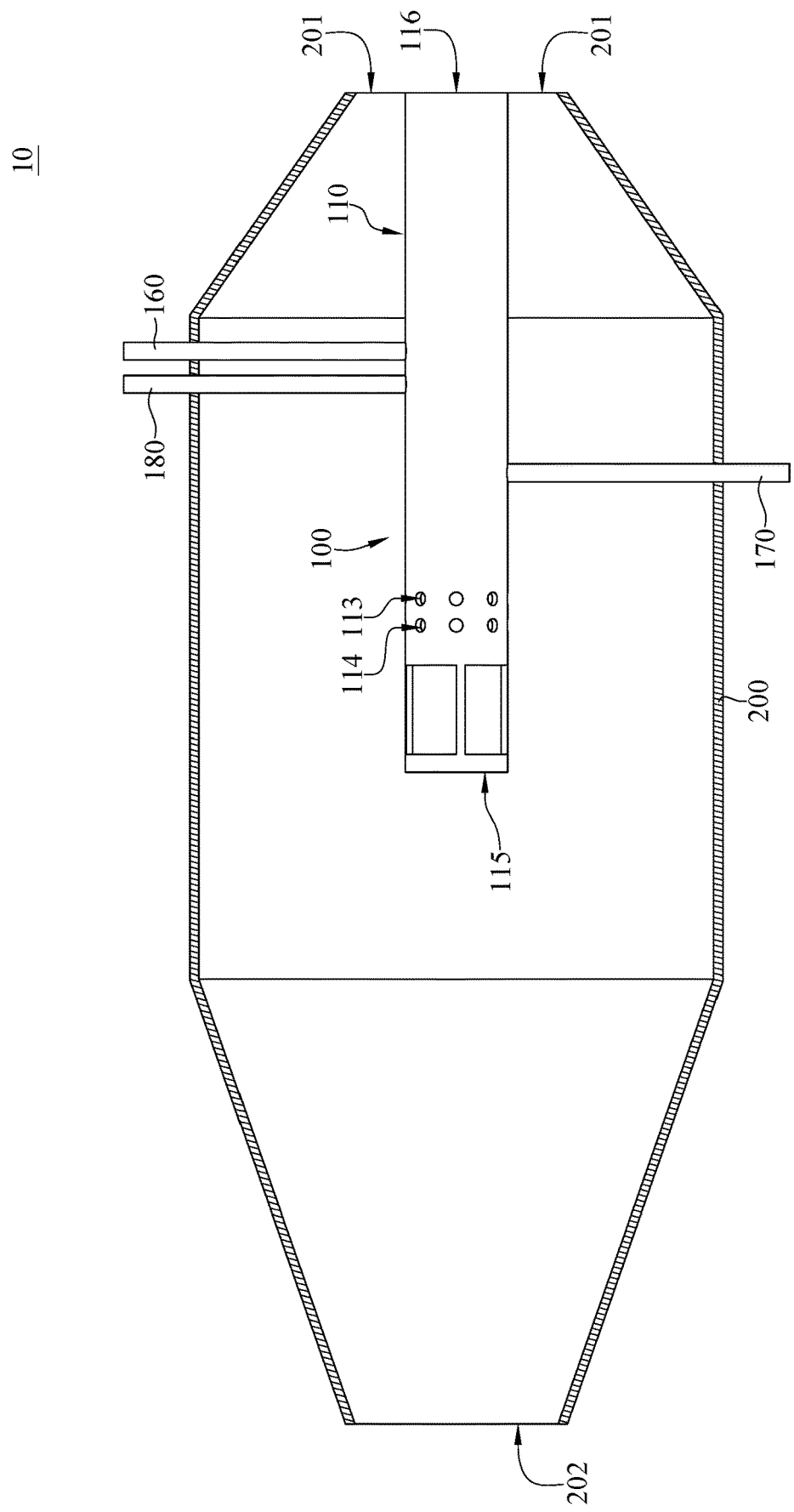
FIG. 2 is a cross-sectional view of a combustor according to another embodiment of the disclosure.

Then, referring FIG. 2, there is shown a cross-sectional view of a combustor 10 according to another embodiment of the disclosure. The combustor 10 includes the nozzle 100 and a casing 200. The nozzle 100 is disposed in the casing 200. The nozzle 100 is the one as shown in FIG. 1. The activation guidance pipe 160, the first reformation guidance pipe 170, and the second reformation guidance pipe 180 of the nozzle 100 are disposed through the casing 200. The casing 200 has an inlet 201 and an outlet 202. The fuel pipe 110 of the nozzle 100 has an inlet 116 located opposite to the outlet 115. The inlet 116 is located at or aligned with the inlet 201 of the casing 200, and the outlet 115 of the nozzle 100 faces towards the outlet 202 of the casing 200 and located between the inlet 201 and the outlet 202 of the casing 200. In one embodiment, the inlet 201 of the casing 200 and the inlet 116 of the fuel pipe 110 have shapes of concentric circles.

When the combustor 10 is in use, air (e.g., oxygen) is provided into the casing 200 via the inlet 201 of the casing 200, such that the air surrounds the fuel pipe 110. The activation fuel is introduced into the nozzle 100 through the activation guidance pipe 160 to produce hydrogen, carbon monoxide, other possible products, and heat. The reformation fuel is introduced into the nozzle 100 through the first reformation guidance pipe 170. Then, the gas produced by the reformation fuel and the remaining reformation fuel can flow out of the nozzle 100 through the second reformation guidance pipe 180.

In addition, the hydrogen and carbon monoxide coming out of the fuel pipe 110 from the vent holes 113 and 114 and the outlet 115 have a relatively high temperature, and when they contact with the ambient air (e.g., oxygen) outside the fuel pipe 110, a dramatic combustion reaction will be caused therebetween. Thus producing carbon dioxide and water steam of even higher temperature, and the temperature of the other ambient air (e.g., oxygen) that does not yet involve in the combustion reaction will be raised thereby. As discussed, the vent holes 113 and 114 are located closer to the first reformation guidance pipe 170 and the second reformation guidance pipe 180 than the outlet 115. Thus the carbon dioxide, the water steam, and the ambient air (e.g., oxygen) around the vent holes 113 and 114 can rapidly increase the temperatures of the first reformation guidance pipe 170 and the second reformation guidance pipe 180. Moreover, the carbon dioxide, the water steam, and the remaining air (e.g., oxygen) around the vent holes 113 and 114 and the outlet 115 can flow out of the casing 200 from the outlet 202 and then can be provided to other components of the fuel cell system that are required to be operated at high temperature.

Figure 3:
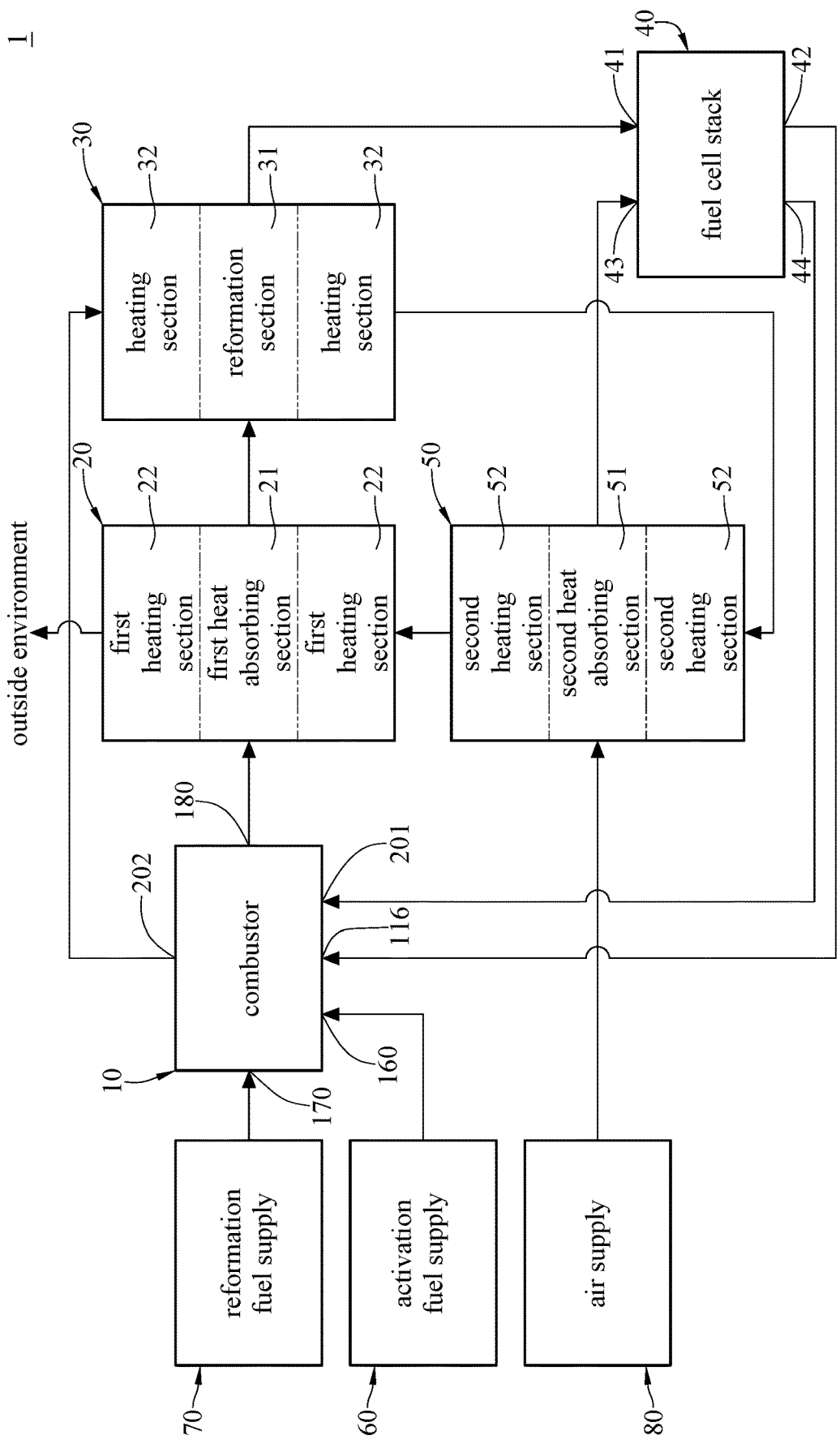
FIG. 3 is a block diagram of a fuel cell system according to still another embodiment of the disclosure.

Then, referring to FIG. 3, there is shown a block diagram of a fuel cell system 1 according to still another embodiment of the disclosure.

The fuel cell system 1 includes a combustor 10, a first heat exchanger 20, a main reformer 30, a fuel cell stack 40, a second heat exchanger 50, an activation fuel supply 60, a reformation fuel supply 70 and an air supply 80. The combustor 10 is the one as shown in FIG. 2, and the nozzle 100 is the one shown in FIG. 1.

The first heat exchanger 20 includes a first heat absorbing section 21 and a first heating section 22. The first heat absorbing section 21 and the first heating section 22 can perform heat exchange therebetween. The first heat absorbing section 21 of the first heat exchanger 20 is connected to the second reformation guidance pipe 180 of the combustor 10 (shown in FIG. 2). The first heating section 22 is in fluid communication with the outside environment. In this embodiment, the first heat exchanger 20 may be a double-pipe heat exchanger that has an inner pipe and an outer pipe of concentric circles. The first heat absorbing section 21 is the internal space of the inner pipe, and the first heating section 22 is the space defined and located between the inner pipe and the outer pipe. Note that the form of the first heat exchanger 20 can be changed according to actual requirements.

The main reformer 30 includes a reformation section 31 and a heating section 32. The reformation section 31 and the heating section can perform heat exchange therebetween. The reformation section 31 also contains the reformation catalyst. The reformation section 31 is connected to the reformer 120 via the second reformation guidance pipe 180 of the nozzle 100 of the combustor 10 and the first heat absorbing section 21 (as shown in FIGS. 1 and 2). The heating section 32 is connected to the outlet 202 of the casing 200 of the combustor 10 (as shown in FIG. 2). In this embodiment, the main reformer 30 may be a double-pipe heat exchanger that having an inner pipe and an outer pipe of concentric circles. The reformation section 31 is the internal space of the inner pipe, and the heating section 32 is the internal space defined and located between the inner pipe and the outer pipe. Note that the form of the main reformer 30 can be changed according to actual requirements.

The fuel cell stack 40 has an anode gas inlet 41, an anode gas outlet 42, a cathode gas inlet 43, and a cathode gas outlet 44. The anode gas inlet 41 is connected to the reformation section 31 of the main reformer 30. The anode gas outlet 42 is connected to the inlet 116 of the fuel pipe 110 of the combustor 10 (as shown in FIG. 2). The cathode gas outlet 44 is connected to the inlet 201 of the casing 200 of the combustor 10 (as shown in FIG. 2). The part of the air (e.g., oxygen) that flows through the cathode of the fuel cell stack 40 and does not yet involve in the electricity generation of the fuel cell stack 40 can be provided to the casing 200 of the combustor 10 (as shown in FIG. 2). The fuel cell stack 40 may be the fuel cell stack of the solid oxide fuel cell system.

The second heat exchanger 50 includes a second heat absorbing section 51 and a second heating section 52. The second heat absorbing section 51 and the second heating section 52 can perform heat exchange therebetween. The second heat absorbing section 51 of the second heat exchanger 50 is connected to the cathode gas inlet 43 of the fuel cell stack 40. The heating section 32 of the main reformer 30 is connected to the first heating section 22 of the first heat exchanger 20 via the second heating section 52 of the second heat exchanger 50. In this embodiment, the second heat exchanger 50 may be a double-pipe heat exchanger that having an inner pipe and an outer pipe of concentric circles. The second heat absorbing section 51 is the space of the inner pipe, and the second heating section 52 is the space defined and located between the inner pipe and the outer pipe. Note that the form of the second heat exchanger 50 can be changed according to actual requirements.

The activation fuel supply 60 is connected to the activation guidance pipe 160 of the nozzle 100 of the combustor 10 (as shown in FIG. 2) for providing the activation fuel. The reformation fuel supply 70 is connected to the reformation guidance pipe 170 of the nozzle 100 of the combustor 10 (as shown in FIG. 2) for providing the reformation fuel. The air supply 80 is connected to the cathode gas inlet 43 of the fuel cell stack 40 via the second heat absorbing section 51 of the second heat exchanger 50 for providing air (e.g., oxygen) to the cathode of the fuel cell stack 40.

When the fuel cell system 1 is in operation, the activation fuel supply 60 provides the activation fuel to the activation guidance pipe 160 of the combustor 10, and the reformation fuel supply 70 provides the reformation fuel to the first reformation guidance pipe 170 of the combustor 10.

The gas in high temperature and containing hydrogen is produced from the reformation fuel by using the reformer 120 of the combustor 10 (as shown in FIG. 1) and can flow into the second reformation guidance pipe 180 with the remaining reformation fuel that is not yet reformed by the reformer 120. In addition, after the activation fuel was burned in the combustor 10, the carbon dioxide and water steam in high temperature is produced in the casing 200, such that the air (e.g., oxygen) in the casing 200 is heated. As a result, the activation fuel is reformed to carbon dioxide and water steam, and the carbon dioxide, water steam, and air of high temperature is output from the outlet 202 of the casing 200 to the reformation section 31 of the main reformer 30.

The gas reformed from the reformation fuel and the remaining reformation fuel coming out from the second reformation guidance pipe 180 is provided to the reformation section 31 of the main reformer 30 by flowing through the first heat absorbing section 21 of the first heat exchanger 20. The carbon dioxide, water steam, and air (e.g., oxygen) output from the outlet 202 of the combustor 10 is provided to the heating section 32 of the main reformer 30 so as to heat the reformation section 31 of the main reformer 30. Therefore, the gas output from the reformation section 31 of the main reformer 30 to the anode gas inlet 41 of the fuel cell stack 40 has higher temperature and contains abundant hydrogen, such that the carbon is prevented from accumulating on the electrodes of the fuel cell stack 40. On the other hand, the carbon dioxide, water steam, and air (e.g., oxygen) output from the heating section 32 flow to the second heating section 52 of the second heat exchanger.

The carbon dioxide, water steam, and air (e.g., oxygen) output from the heating section 32 is provided to the second heating section 52 of the second heat exchanger, thereby heating the second heat absorbing section 51 of the second heat exchanger 50. Then, the second heating section 52 outputs the carbon dioxide, water steam, and air (e.g., oxygen) to the first heating section 22 to heat the first heat absorbing section 21 of the first heat exchanger 20, and then flow to outside environment.

Then, the air supply 80 provides air (e.g., oxygen) to the second heat absorbing section 51 of the second heat exchanger 50. At this moment, the air (e.g., oxygen) can be heated by the second heating section 52, and then is provided to the cathode gas inlet 43 of the fuel cell stack 40.

As discussed, the hydrogen in high temperature can be provided to the anode of the fuel cell stack 40, and the air (or oxygen) in high temperature can be provided to the cathode of the fuel cell stack 40, allowing the fuel cell stack 40 to generate electricity. The remaining hydrogen that does not yet involve the electricity generation of the fuel cell stack 40 can be output from the anode gas outlet 42 of the fuel cell stack 40 and provided to the inlet 116 of the fuel pipe 110 of the combustor 10 (as shown in FIG. 2). And the remaining air (e.g., oxygen) that does not yet involve the electricity generation of the fuel cell stack 40 can be output from the cathode gas outlet 44 of the fuel cell stack 40 and provided to the inlet 201 of the casing 200 of the combustor 10 (as shown in FIG. 2). Such that the remaining hydrogen and the remaining air (or oxygen) can reacts in the combustor 10, thereby outputting carbon dioxide and water steam of high temperature out of the casing 200 from the outlet 202 of the casing 200. The fuel cell system 1 can keep generating electricity by providing the reformation fuel and air (e.g., oxygen).

In this embodiment, in the case that the fuel cell stack 40 is the fuel cell stack of the solid oxide fuel cell system, the water steam produced by the electricity generation of the fuel cell stack 40 can be discharge to the inlet 116 of the fuel pipe 110 of the combustor 10 from the anode gas outlet 42 (as shown in FIG. 2), but the present disclosure is not limited thereto. In some other embodiments, in the case that the fuel cell stack 40 is the fuel cell stack of another type of the fuel cell system, the water steam produced by the electricity generation of the fuel cell stack 40 can be discharged from the cathode gas outlet 44.

According to the nozzle, the combustor, and the fuel cell system as discussed above, the reformer is disposed in the fuel pipe of the nozzle, and the activation pipe is disposed through the reformer. Such that the temperature of the reformation catalyst in the reformer can be increased by the reaction between the activation catalyst and the activation fuel when the fuel cell system begins to operate. Thereby increasing the efficiency of the reforming process of the reformer and decreasing the ratio of the reformation fuel, that is not yet reformed by the reformer, to the gas flowing out of the reformer.

In addition, the carbon dioxide and water steam in high temperature produced by the combustor can heat the main reformer of the fuel cell system to increase the efficiency of the reforming process of the main reformer. Such that the reformation fuel after passing through the reformer of the combustor and the main reformer can be reformed to the gas containing a high proportional hydrogen and a small proportional reformation fuel, thereby preventing the accumulation of carbon on the fuel cell stack of the fuel cell system.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A nozzle for combustion and reforming reaction, comprising:
    a fuel pipe, comprising an annular wall and an end wall connected to an end of the annular wall, wherein the fuel pipe has at least one vent hole penetrating through the annular wall and at least one outlet penetrating through the end wall;
    a reformer, disposed in the fuel pipe;
    an activation pipe, disposed in the fuel pipe and disposed through the reformer, wherein a distance between the activation pipe and the at least one outlet is larger than a distance between the at least one vent hole and the at least one outlet;
    an activation catalyst, arranged in the activation pipe; and
    a reformation catalyst, arranged in the reformer and located outside the activation pipe;
    wherein the nozzle further comprises an activation guidance pipe, the activation guidance pipe is disposed through the annular wall of the fuel pipe, and is in fluid communication with the activation pipe, and the reformer is located between the activation guidance pipe and the at least one vent hole in an extension direction of the activation pipe;
    wherein the nozzle further comprises a first reformation guidance pipe and a second reformation guidance pipe, the first reformation guidance pipe and the second reformation guidance pipe are disposed through the annular wall of the fuel pipe, and are in fluid communication with the reformer, the first reformation guidance pipe is located between the second reformation guidance pipe and the at least one vent hole in an extension direction of the activation pipe, the first reformation guidance pipe is configured for an inlet of gas into the reformer, and the second reformation guidance pipe is configured for an outlet of gas from the reformer;
    wherein the nozzle further comprises a ceramic heat storage component, wherein the ceramic heat storage component is disposed at the end wall of the fuel pipe, and the ceramic heat storage component has a porosity smaller than 100%;
    wherein the at least one vent hole is not in fluid communication with the reformer.

2. The nozzle according to claim 1, wherein a ratio of an area of the at least one vent hole to an area of the at least one outlet ranges between 0.07 and 3.21.

3. The nozzle according to claim 1, wherein a ratio of an area of the at least one vent hole to an area of the at least one outlet divided by the porosity of the ceramic heat storage component ranges between 0.07 and 3.21.

4. A combustor, comprising:
    the nozzle according to claim 1; and
    a casing, wherein the nozzle is disposed in the casing.

5. The combustor according to claim 4, wherein a ratio of an area of the at least one vent hole to an area of the at least one outlet ranges between 0.07 and 3.21.

6. The combustor according to claim 4 wherein the activation guidance pipe is disposed through the casing.

7. The combustor according to claim 4, wherein the first reformation guidance pipe and the second reformation guidance pipe are disposed through the casing.

8. The combustor according to claim 4, wherein a ratio of an area of the at least one vent hole to an area of the at least one outlet divided by the porosity of the ceramic heat storage component ranges between 0.07 and 3.21.

9. A fuel cell system, comprising:
    a combustor, comprising:
        the nozzle according to claim 1; and
        a casing, wherein the nozzle is disposed in the casing;
    a main reformer, connected to the reformer of the nozzle of the combustor; and
    a fuel cell stack, having an anode gas inlet and an anode gas outlet, wherein the anode gas inlet is connected to the main reformer, and the anode gas outlet is connected to the fuel pipe of the nozzle of the combustor.

10. The fuel cell system according to claim 9, wherein the activation guidance pipe is disposed through the casing, and the fuel cell system further comprises an activation fuel supply connected to the activation guidance pipe.

11. The fuel cell system according to claim 9, wherein the first reformation guidance pipe and the second reformation guidance pipe are disposed through the casing, and the main reformer is connected to the reformer via the second reformation guidance pipe.

12. The fuel cell system according to claim 9, wherein the first reformation guidance pipe and the second reformation guidance pipe are disposed through the casing, and the fuel cell system further comprises a reformation fuel supply connected to the first reformation guidance pipe.

13. The fuel cell system according to claim 9, further comprising a first heat exchanger, wherein the first heat exchange has a first heat absorbing section and a first heating section, the main reformer is connected to the combustor via the first heat absorbing section of the first heat exchanger.

14. The fuel cell system according to claim 13, further comprising a second heat exchanger, wherein the second heat exchanger has a second heat absorbing section and a second heating section, the main reformer has a reformation section and a heating section, the reformation section is connected to the first heat absorbing section, the casing of the combustor is connected to the second heating section of the second heat exchanger via the heating section of the main reformer, and the second heating section is connected to the first heating section.

15. The fuel cell system according to claim 14, further comprising an air supply, wherein the fuel cell stack has a cathode gas inlet, the air supply is connected to the cathode gas inlet of the fuel cell stack via the second heat absorbing section of the second heat exchanger.

16. The fuel cell system according to claim 9, wherein the fuel cell stack has a cathode gas outlet connected to the casing of the combustor.

* * * * *